United States Patent
Maddali et al.

(10) Patent No.: US 11,548,450 B2
(45) Date of Patent: Jan. 10, 2023

(54) ELECTROMAGNETIC JOINT FOR A VEHICLE

(71) Applicant: Ford Global Technologies, LLC, Dearborn, MI (US)

(72) Inventors: Murali Krishna Maddali, Canton, MI (US); Israel Corrilo Garcia, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 16/790,872

(22) Filed: Feb. 14, 2020

(65) Prior Publication Data

US 2021/0253037 A1    Aug. 19, 2021

(51) Int. Cl.
*B60R 11/02* (2006.01)
*B60R 21/0134* (2006.01)
*B60R 11/00* (2006.01)

(52) U.S. Cl.
CPC ...... *B60R 11/0235* (2013.01); *B60R 21/0134* (2013.01); *B60R 2011/0005* (2013.01); *B60R 2011/007* (2013.01); *B60R 2011/0057* (2013.01)

(58) Field of Classification Search
CPC ....... B60R 2011/0057; B60R 2011/007; B60R 2021/01; B60R 2021/01013; B60R 2011/0005; B60R 11/0235; B60R 21/0134
See application file for complete search history.

(56) References Cited

U.S. PATENT DOCUMENTS

| | | | |
|---|---|---|---|
| 7,097,082 B2* | 8/2006 | Wallaker | B60R 11/02 224/483 |
| 9,221,397 B1* | 12/2015 | Kim | B60R 1/076 |
| 9,855,899 B2* | 1/2018 | Rode | B60R 11/0235 |
| 10,037,054 B2 | 7/2018 | Corbin et al. | |
| 11,012,667 B1* | 5/2021 | Nodder | G08B 25/008 |
| 2002/0066392 A1* | 6/2002 | Calam | F16M 11/40 108/33 |
| 2015/0136559 A1* | 5/2015 | Brumberger | F16D 48/064 192/84.9 |

FOREIGN PATENT DOCUMENTS

| | | |
|---|---|---|
| WO | 2007037807 A1 | 4/2007 |
| WO | 2015057241 A1 | 4/2015 |

\* cited by examiner

*Primary Examiner* — Adam J Waggenspack
(74) *Attorney, Agent, or Firm* — Vichit Chea; Price Heneveld LLP

(57) ABSTRACT

A vehicle system is disclosed herein. The vehicle includes a vehicle structure. A vehicle component is coupled to the vehicle structure via electromagnetic attraction. The controller is configured to generate a command to vary the amount of electromagnetic attraction between the vehicle structure and the vehicle component in response to a received vehicle threat signal.

11 Claims, 4 Drawing Sheets

ELECTROMAGNETIC JOINT FOR A VEHICLE

FIELD OF THE DISCLOSURE

The present disclosure generally relates to an electromagnetic joint. More specifically, the present disclosure relates to an electromagnetic joint for a vehicle.

BACKGROUND OF THE DISCLOSURE

Vehicles often include vehicle display units, such as a touch screen disposed on a vehicle instrument panel. Large vehicle display units may be heavier than ordinary vehicle display units, which may necessitate the use of bolts and other generally unyielding structures to couple the larger vehicle display units to the vehicle instrument panels in a secure, user-friendly manner. Utilizing generally unyielding coupling structures may inhibit the attached vehicle display unit from yielding to outside forces during a vehicle impact event. A system that enables a vehicle component to be coupled to a vehicle structure by varying amounts of force may be desired.

SUMMARY OF THE DISCLOSURE

According to a first aspect of the present disclosure, a vehicle system includes a vehicle structure. A vehicle component is coupled to the vehicle structure via electromagnetic attraction. A controller is configured to generate a command to vary the amount of electromagnetic attraction between the vehicle structure and the vehicle component in response to a received vehicle threat signal.

Embodiments of the first aspect of the present disclosure can include any one or a combination of the following features:
- the vehicle component comprises a vehicle display unit;
- the vehicle structure comprises a vehicle instrument panel;
- the controller is configured to generate a command to decrease the amount of electromagnetic attraction between the vehicle structure and the vehicle component in response to the received vehicle threat signal;
- the vehicle threat signal received by the controller is transmitted to the controller based on a vehicle impact event;
- an attachment feature configured to couple the vehicle structure to the vehicle component; and
- the attachment feature is configured to maintain the vehicle structure and the vehicle component in a coupled relationship irrespective of the amount of electromagnetic attraction between the vehicle component and the vehicle structure.

According to a second aspect of the present disclosure, a vehicle system includes a vehicle structure. A vehicle component is coupled to the vehicle structure via electromagnetic attraction. A controller is configured to control the amount of electromagnetic attraction that couples the vehicle component to the vehicle structure such that a first amount of electromagnetic attraction couples the vehicle component to the vehicle structure when the vehicle is in a normal use condition and a second amount of electromagnetic attraction couples the vehicle component to the vehicle structure when the vehicle is in a vehicle threat condition. The first amount of electromagnetic attraction is greater than the second amount of electromagnetic attraction.

Embodiments of the second aspect of the present disclosure can include any one or a combination of the following features:
- the vehicle component comprises a vehicle display unit;
- the vehicle structure comprises a vehicle instrument panel;
- an attachment feature is configured to couple the vehicle structure to the vehicle component;
- the attachment feature is configured to maintain the vehicle structure and the vehicle component in a coupled relationship irrespective of the amount of electromagnetic attraction between the vehicle component and the vehicle structure;
- the vehicle enters the vehicle threat condition as a result of a vehicle impact event; and
- the vehicle enters the vehicle threat condition based on an expected vehicle impact event.

According to a third aspect of the present disclosure, a method of operating a vehicle includes the steps of sensing at least one of an expected vehicle impact event and a vehicle impact event and varying an amount of electromagnetic attraction coupling a vehicle component to a vehicle structure based on the sensed at least one of the expected vehicle impact event and the vehicle impact event.

Embodiments of the third aspect of the present disclosure can include any one or a combination of the following features or steps:
- the amount of electromagnetic attraction coupling the vehicle component to the vehicle structure decreases based on the sensed at least one of the expected vehicle impact event and the vehicle impact event;
- the amount of electromagnetic attraction coupling the vehicle component to the vehicle structure decreases such that electromagnetic attraction between the vehicle component and the vehicle structure is substantially eliminated based on the sensed at least one of the expected vehicle impact event and the vehicle impact event;
- the vehicle component comprises a vehicle display unit;
- the vehicle structure comprises a vehicle instrument panel; and
- maintaining the vehicle component and the vehicle structure in a coupled relationship via an attachment feature, irrespective of the amount of electromagnetic attraction coupling the vehicle component to the vehicle structure.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
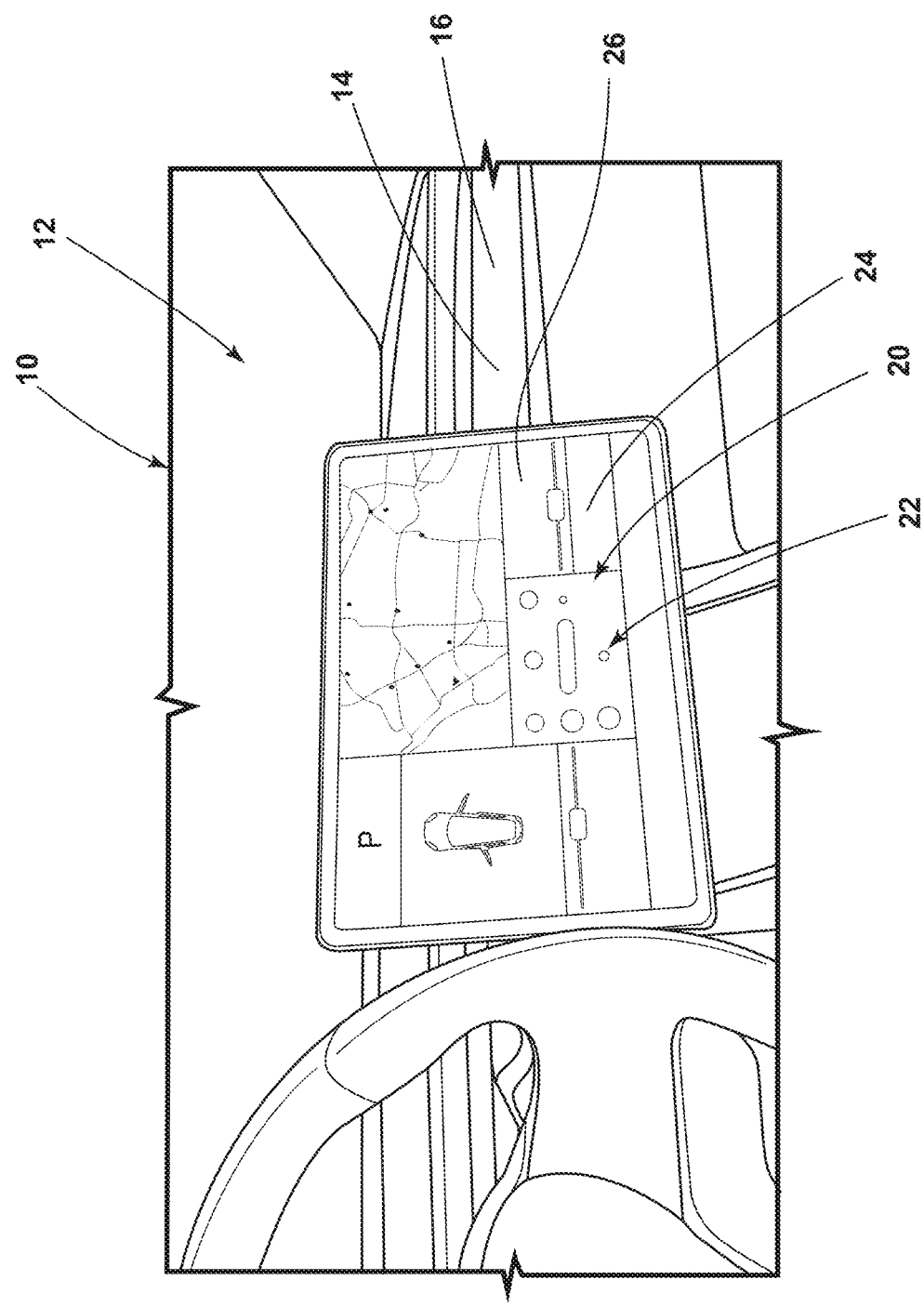
FIG. 1 is a perspective view of a vehicle interior of the vehicle, illustrating a vehicle display unit coupled to an instrument panel of the vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-4, a vehicle 10 includes a vehicle structure 14. A vehicle component 20 is coupled to the vehicle structure 14 via electromagnetic attraction. A controller 48 is configured to generate a command to vary the amount of electromagnetic attraction between the vehicle structure 14 and the vehicle component 20 in response to a received vehicle threat signal 58.

Referring now to FIG. 1, in various embodiments, the vehicle 10 may include a vehicle interior 12. The vehicle interior 12 may include the vehicle structure 14. In various embodiments, the vehicle interior 12 may include a plurality of vehicle structures 14 (e.g., steering wheel, ceiling assembly, center console box, etc.). In some embodiments, the vehicle structure 14 may be an instrument panel 16, as shown in FIG. 1.

The vehicle 10 may include a vehicle component 20. In various embodiments, the vehicle 10 may include a plurality of vehicle components 20. In some embodiments, the vehicle component 20 may be a vehicle interior component 22. In other words, the vehicle component 20 may be a component of the vehicle 10 that is disposed within the vehicle interior 12. In some embodiments, the vehicle component 20 may include a vehicle display unit 24, as shown in FIG. 1. In some embodiments, the vehicle display unit 24 may include a touch screen 26. It is contemplated that the vehicle structure 14 may be one or more of a variety of structures of the vehicle 10. Further, it is contemplated that the vehicle component 20 may be one or more variety of components of the vehicle 10.

Figure 2:
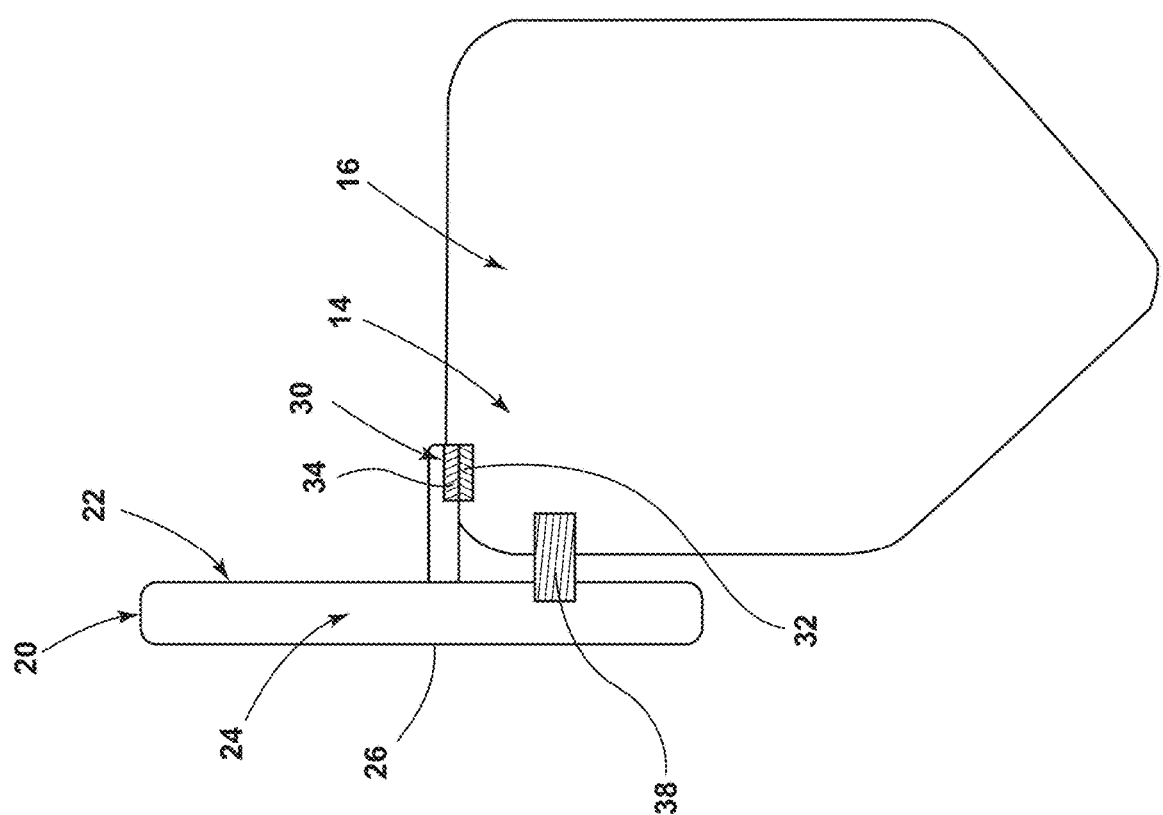
FIG. 2 is a side view of the vehicle display unit coupled to the instrument panel, illustrating an electromagnetic joint for coupling the vehicle display unit to the instrument panel and an attachment feature for further coupling the vehicle display unit to the instrument panel, according to one embodiment.

Referring now to FIGS. 1 and 2, in various embodiments, the vehicle component 20 may be coupled to the vehicle structure 14. In some embodiments, the vehicle component 20 may be coupled to the vehicle structure 14 via electromagnetic attraction. In various embodiments, an electromagnetic joint 30 may couple the vehicle component 20 to the vehicle structure 14 via the electromagnetic attraction. The electromagnetic joint 30 may include a first magnetic element 32 that is coupled to the vehicle structure 14 and a second magnetic element 34 that is coupled to the vehicle component 20 and configured to magnetically engage with the first magnetic element 32. For example, as illustrated in FIG. 2, the electromagnetic joint 30 may include the first magnetic element 32, which is coupled to the instrument panel 16 and the second magnetic element 34 that is coupled to the vehicle display unit 24. The electromagnetic attraction between the first and second magnetic elements 32, 34, may cause the instrument panel 16 and the vehicle display unit 24 to be coupled to one another.

It is contemplated that, in various embodiments, the first and/or second magnetic elements 32, 34 may be electromagnets. In other words, the first magnetic element 32 and/or the second magnetic element 34 may be supplied with electrical current that produces electromagnetic attraction between the first and second magnetic elements 32, 34. For example, in some embodiments, the first magnetic element 32 may be the electromagnet, while the second magnetic element 34 may be composed of a magnetic material. In some examples, the second magnetic element 34 may be the electromagnet and the first magnetic element 32 may be composed of magnetic material. Further, in some examples, both the first magnetic element 32 and the second magnetic element 34 may be electromagnets.

It is contemplated that the first and second magnetic elements 32, 34 may be portions of the vehicle structure 14 and the vehicle component 20, respectively, that are configured to be coupled together. For example, the first magnetic element 32 may be a portion of the instrument panel 16 of the vehicle 10, such as a metal bracket, and the second magnetic element 34 may be a portion of the vehicle display unit 24, such as a metal backing of the vehicle display unit 24 that is configured to correspond with the bracket of the instrument panel 16. In such embodiments, at least one of the bracket and the metal backing may be an electromagnet configured to electromagnetically attract the other feature. In various embodiments, electricity from a power source of the vehicle 10, such as a battery, may supply current to the one or more magnetic elements 32, 34 embodied as electromagnets to operate the electromagnetic joint 30 and couple the vehicle component 20 to the vehicle structure 14.

Referring now to FIG. 2, in various embodiments, the vehicle component 20 may be coupled to the vehicle structure 14 by an attachment feature 38 in addition to, or in the alternative to, the electromagnetic joint 30. In various embodiments, the attachment feature 38 may be one or more of a variety of features configured to couple the vehicle component 20 and the vehicle structure 14. In some embodiments, the attachment feature 38 may be configured to couple the vehicle component 20 and the vehicle structure 14 in addition to the electromagnetic joint 30 that couples the vehicle component 20 to the vehicle structure 14 via electromagnetic attraction. In some examples, the attachment feature 38 may be configured to maintain the vehicle structure 14 and the vehicle component 20 in a coupled relationship irrespective of the amount of electromagnetic attraction between the vehicle components 20 and the vehicle structure 14. In other words, the attachment feature 38 may be configured to couple the vehicle component 20 to the vehicle structure 14 under circumstances where electromagnetic attraction is being applied between the vehicle component 20 and the vehicle structure 14 and under circumstances where there is little or no electromagnetic attraction between the vehicle component 20 and the vehicle structure 14. An exemplary embodiment of the attachment feature 38 is illustrated in FIG. 2. As shown, the vehicle display unit 24 is coupled to the instrument panel 16 of the vehicle 10 via the electromagnetic joint 30, as well as via the attachment feature 38. It is contemplated that the attachment feature 38 may be one or more of a variety of types of features configured to couple the vehicle component 20 to the vehicle structure 14, and the attachment feature 38 may be made of one or more materials suitable for coupling a vehicle component 20 to the vehicle structure 14, in various embodiments.

Figure 3:
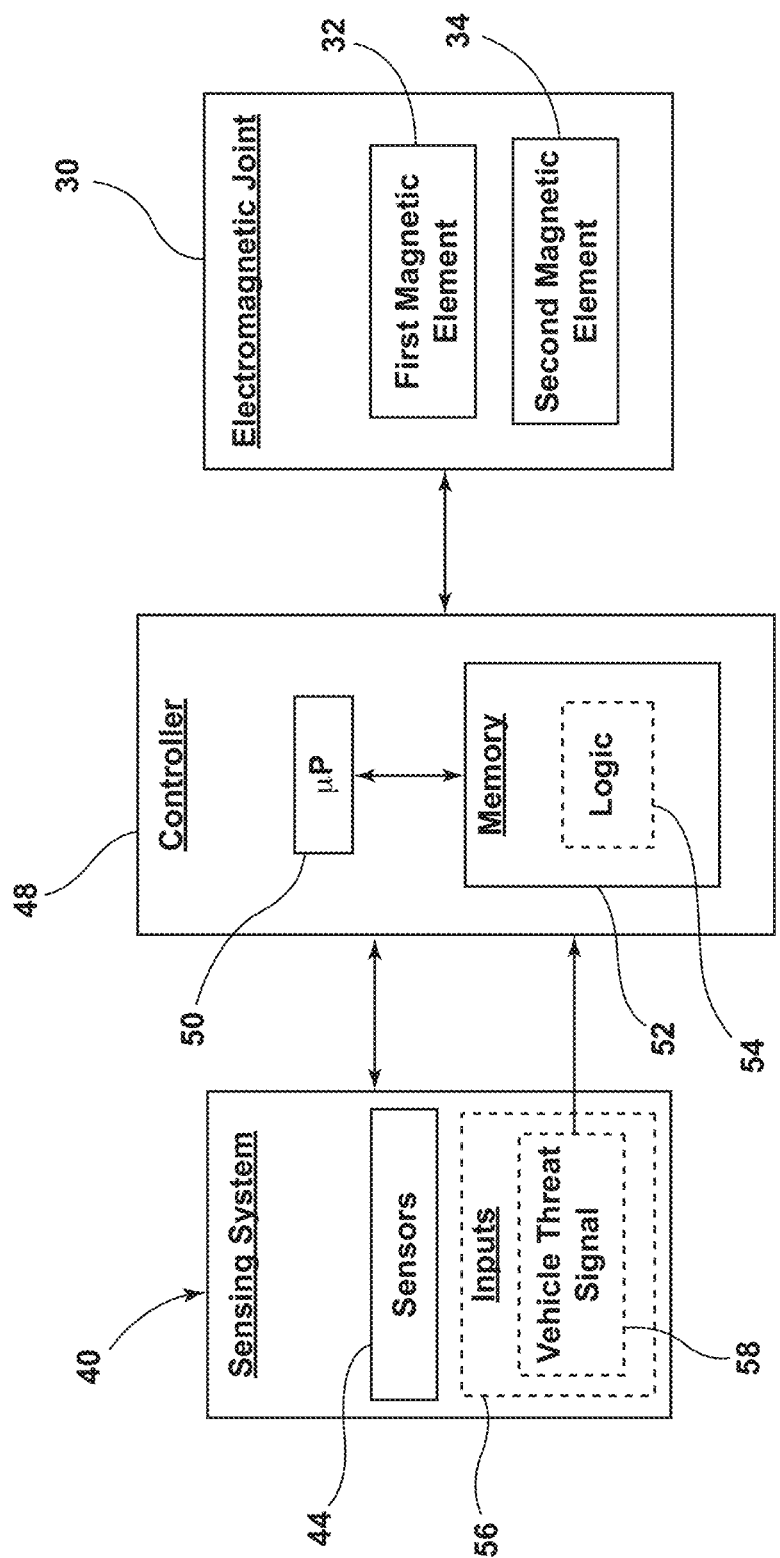
FIG. 3 is a block diagram illustrating a controller of the vehicle in communication with a sensing system and the electromagnetic joint, according to one embodiment.

Referring now to FIG. 3, in various embodiments, the vehicle 10 may include a sensing system 40. The sensing system 40 may include one or more sensors 44 for sensing a vehicle impact event. In other words, the sensing system 40 may include one or more sensors 44 for detecting an impact of the vehicle 10. In some embodiments, one or more of the sensors 44 of the sensing system 40 may be configured to detect a frontal impact event of the vehicle 10. It is contemplated that, in various embodiments, the sensing system 40 may include a plurality of sensors 44 disposed at various positions of the vehicle 10 for sensing various directions, magnitudes, etc. of impacts. In some embodiments, the sensing system 40 may alternatively or additionally include one or more sensors 44 configured to sense an expected vehicle impact event prior to impact (i.e., pre-impact sensing). The one or more sensors 44 may be of any suitable type (e.g., radar, LIDAR, and/or a vision system). The vision system may include one or more cameras, CCD image sensors, and/or CMOS image sensor, etc.

Referring still to FIG. 3, in various embodiments, the sensing system 40 may be configured to transmit vehicle threat signals 58 indicating an expected vehicle impact event and/or a vehicle impact event to a controller 48 of the vehicle 10. The controller 48 may be configured to receive various inputs 56 and control various outputs. The controller 48 may be a shared or dedicated controller 48 that includes a microprocessor 50 and memory 52, as illustrated in FIG. 3, according to various embodiments. It should be appreciated that the controller 48 may include control circuitry, such as analog and/or digital control circuitry. Stored within the memory 52 and executed by the microprocessor 50 is logic 54 for processing the various inputs 56 and controlling various outputs described herein. The inputs 56 to the controller 48 may include the vehicle threat signal 58, which in some embodiments, may be made available from another controller 48 via a vehicle data communication line or a shared bus, and may indicate that a threat to the vehicle 10 has been detected.

In various embodiments, the vehicle threat signal 58 may be transmitted to the controller 48 from the sensing system 40 based on the sensing system 40 sensing that a vehicle impact event has occurred (e.g., frontal impact event, vehicle rollover, etc.). In some embodiments, the vehicle threat signal 58 may be transmitted to the controller 48 from the sensing system 40 based on the sensing system 40 sensing that a vehicle impact event is expected to occur. For example, the sensing system 40 may transmit the vehicle threat signal 58 to the controller 48 in response to one or more sensors 44 detecting an object disposed in front of the moving vehicle 10 in such a position that the vehicle 10 may likely be unable to avoid an impact with the object at the vehicle's traveling speed. Further, in some embodiments, the vehicle threat signal 58 may be transmitted to the controller 48 from another controller or system outside of the vehicle 10. For example, the vehicle threat signal 58 may be transmitted to the controller 48 from another vehicle via a vehicle-to-vehicle communication protocol. Such a vehicle threat signal 58 may likewise communicate a threat to the vehicle 10.

In various embodiments, the controller 48 may be configured to control various outputs based on inputs 56 received. In some embodiments, the controller 48 may control operation of the electromagnetic joint 30 based on inputs 56 received. In some examples, the controller 48 may control operation of the electromagnetic joint 30 by generating a command to vary the amount of electromagnetic attraction between the vehicle structure 14 and the vehicle component 20 based on a received input 56. In various embodiments, the controller 48 may vary the amount of electromagnetic attraction between the vehicle structure 14 and the vehicle component 20 by controlling the amount of current supplied to the first magnetic element 32 coupled to the vehicle structure 14 and/or the second magnetic element 34 coupled to the vehicle component 20. For example, the controller 48 may generate a command that causes the amount of current supplied to the first magnetic element 32 to decrease, which decreases the electromagnetic attraction (holding force) between the first magnetic element 32 and the second magnetic element 34, which in turn decreases the electromagnetic attraction coupling the vehicle structure 14 to the vehicle component 20.

In various embodiments, the controller 48 may be configured to vary the amount of electromagnetic attraction between the vehicle structure 14 and the vehicle component 20 based on the vehicle threat signal 58 being received by the controller 48. In some embodiments, the controller 48 may generate a command to decrease the amount of electromagnetic attraction between the vehicle structure 14 and the vehicle component 20 based on a received vehicle threat signal 58. For example, in some embodiments, the controller 48 may generate a command to decrease the amount of electromagnetic attraction between the instrument panel 16 and the vehicle display unit 24 coupled to the instrument panel 16 in response to receiving a vehicle threat signal 58 from the sensing system 40 indicating that an impact event of the vehicle 10 is expected or has occurred.

In some embodiments, the controller 48 may decrease the amount of electromagnetic attraction coupling the vehicle component 20 to the vehicle structure 14, such that electromagnetic attraction between the vehicle component 20 and the vehicle structure 14 is substantially eliminated based on the received vehicle threat signal 58. In other words, the controller 48 may cause the current being supplied to the electromagnetic joint 30 to be cut off or adjusted, such that a repulsion force rather than an attraction force occurs between the vehicle structure 14 and the vehicle component 20.

In further reference to FIG. 3, in various embodiments, the vehicle 10 may be operable between a normal use condition and a vehicle threat condition. In various embodiments, the vehicle 10 may be in the normal use condition during generally ordinary, intended use of the vehicle 10. In some embodiments, the vehicle 10 may be in the normal use condition when the vehicle is running and a vehicle impact event is not occurring and/or imminently expected based on data from the sensing system 40. In some embodiments, the vehicle 10 may be in the normal use condition when the vehicle 10 is running, and the controller 48 has not received the vehicle threat signal 58 from the sensing system 40.

In various embodiments, the vehicle 10 may enter the vehicle threat condition upon the controller 48 receiving the vehicle threat signal 58 from the sensing system 40. In some embodiments, in which the sensing system 40 transmits the vehicle threat signal 58 to the controller 48 based on sensing the occurrence of a vehicle impact event, the vehicle 10 may enter the vehicle threat condition as a result of a vehicle impact event occurring, which is sensed by the sensing system 40 and transmitted to the controller 48. In some embodiments, in which the sensing system 40 transmits the vehicle threat signal 58 to the controller 48 based on sensing an expected vehicle impact event, the vehicle 10 may enter the vehicle threat condition based on an expected vehicle impact event, which is sensed by the sensing system 40 and transmitted to the controller 48.

In various embodiments, the controller 48 may be configured to control the amount of electromagnetic attraction that couples the vehicle component 20 to the vehicle structure 14, such that a first amount of electromagnetic attraction couples the vehicle component 20 to the vehicle structure 14 when the vehicle 10 is in the normal use condition and a second amount of electromagnetic attraction couples the vehicle component 20 to the vehicle structure 14 when the vehicle 10 is in the vehicle threat condition. In various embodiments, the first amount of electromagnetic attraction may be greater than the second amount of electromagnetic attraction. In other words, the amount of electromagnetic attraction between the vehicle component 20 and the vehicle structure 14 when the vehicle 10 is in the normal use condition may be greater than the amount of electromagnetic attraction when the vehicle 10 is in the vehicle threat condition. For example, in some embodiments, when the vehicle shifts from the normal use condition to the vehicle threat condition, the amount of electromagnetic attraction may be decreased such that the electromagnetic attraction between the vehicle component 20 and the vehicle structure 14 is substantially eliminated. It is contemplated that the electromagnetic attraction may decrease by a variety of amounts in various embodiments (e.g., 50% decrease, 75% decrease, 100% decrease, etc.).

In operation of a non-limiting exemplary embodiment of the vehicle 10, the vehicle 10 may be moving down the road in the normal use condition while an oncoming vehicle turns in front of the vehicle 10, causing a frontal vehicle impact event between the oncoming vehicle and the vehicle 10. The sensors 44 of the sensing system 40 sense the impact event and send a vehicle threat signal 58 to the controller 48. The controller 48 receives the vehicle threat signal 58 from the sensing system 40 and the vehicle 10 enters the vehicle threat condition. In response to receiving the vehicle threat signal 58, the controller 48 generates a command to decrease the amount of electromagnetic attraction between the vehicle display unit 24 and the instrument panel 16 of the vehicle 10. The attachment feature 38 maintains the vehicle display unit 24 in a coupled relationship with the instrument panel 16, despite the decrease in electromagnetic attraction between the vehicle display unit 24 and the instrument panel 16 coming from the electromagnetic joint 30. The reduced electromagnetic attraction between the vehicle display unit 24 and the instrument panel 16 aids in allowing the vehicle display unit 24 to yieldingly move in response to being contacted by forces within the vehicle 10 during the vehicle impact event.

Figure 4:
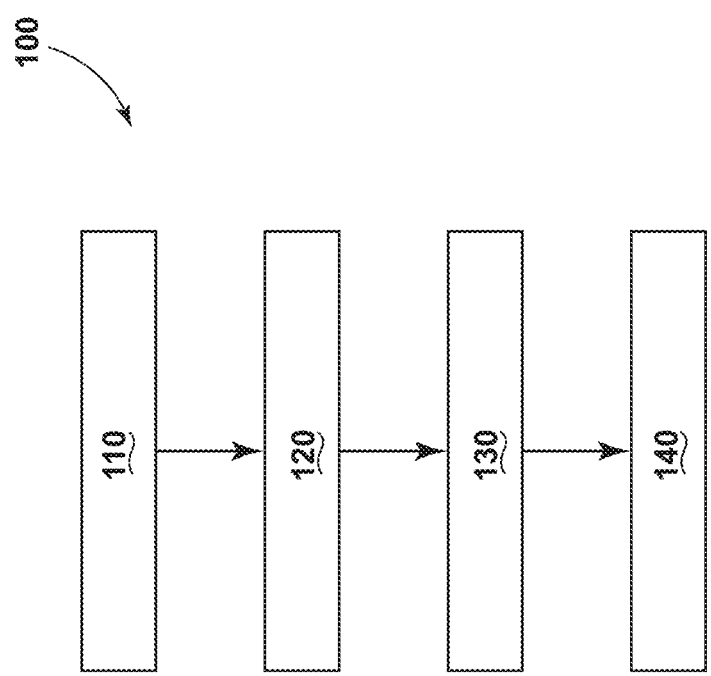
FIG. 4 is a flow chart of a method of operating the vehicle, according to one embodiment.

Referring now to FIG. 4, a method 100 of operating the vehicle 10 is illustrated. The method 100 includes the step 110 of sensing a vehicle threat. In various embodiments, the step 110 of sensing a vehicle threat may entail sensing a vehicle impact event, as discussed above. Further, in some embodiments, the step 110 of sensing a vehicle threat may entail sensing an expected vehicle impact event, as discussed above. The vehicle threat may be sensed via the sensing system 40 of the vehicle, in various embodiments.

The method 100 of operating the vehicle 10 may include the step 120 of receiving a vehicle threat signal 58. In various embodiments, the vehicle threat signal 58 may be received from the sensing system 40 in response to a vehicle threat being sensed. For example, as discussed above, the vehicle threat signal 58 may be received from the sensing system 40 in response to the occurrence of a vehicle impact event. In some embodiments, the vehicle threat signal 58 may be received from the sensing system 40 in response to the sensing system 40 sensing an expected vehicle impact event. In some embodiments, the vehicle threat signal 58 may be received from another system and/or vehicle. For example, another vehicle may communicate the vehicle threat signal 58 to the vehicle 10 via vehicle-to-vehicle communication that indicates a threat to the vehicle 10, such as an imminent expected vehicle impact event.

The method 100 of operating the vehicle 10 may include the step 130 of varying the amount of electromagnetic attraction that couples the vehicle component 20 to the vehicle structure 14. In various embodiments, the amount of electromagnetic attraction coupling the vehicle components 20 to the vehicle structure 14 may be varied based on the sensed vehicle threat. For example, the electromagnetic attraction that couples the vehicle component 20 to vehicle structure 14 may be varied as a result of the vehicle threat being sensed by the sensing system 40 due to the sensing system 40 sending the vehicle threat signal 58 to the controller 48, which then generates a command to vary the amount of electromagnetic attraction that couples the vehicle component 20 to the vehicle structure 14. In various embodiments, the amount of electromagnetic attraction coupling the vehicle 10 to the vehicle structure 14 may be decreased based on a vehicle threat being sensed. For example, a sensed vehicle impact event may prompt the electromagnetic attraction between the vehicle display unit 24 and the instrument panel 16 to be decreased.

The method 100 of operating the vehicle 10 may include the step 140 of maintaining the vehicle component 20 and the vehicle structure 14 in a coupled relationship via the attachment feature 38. In various embodiments, the vehicle display unit 24 and the instrument panel 16 may be maintained in the coupled relationship via the attachment feature 38. In some embodiments, the step 140 of maintaining the vehicle component 20 and the vehicle structure 14 in a coupled relationship via the attachment feature 38 may occur irrespective of the amount of electromagnetic attraction, coupling the vehicle component 20 to the vehicle structure 14. In other words, the vehicle structure 14 and the vehicle component 20 may be maintained in a coupled relationship when there is electromagnetic attraction being applied and when there is little or no electromagnetic attraction between the vehicle component 20 and the vehicle structure 14.

The present disclosure may provide a variety of advantages. First, the ability to couple the vehicle display unit 24 with the instrument panel 16 with the electromagnetic joint 30 via a relatively large amount of electromagnetic attraction may increase the stability of the attachment of the vehicle display unit 24 to the instrument panel 16, which may generally prevent unwanted movement of the vehicle display unit 24 due to engagement by a vehicle occupant during the normal use condition of the vehicle 10. Second, reducing the amount of electromagnetic attraction between the vehicle display unit 24 and the instrument panel 16 of the vehicle 10 when the vehicle 10 is in the vehicle threat condition may enable the vehicle display unit 24 to yield to forces that come in contact with the vehicle display unit 24 during an impact event of the vehicle 10. Third, the attachment feature 38 may maintain the vehicle display unit 24 in a coupled relationship with the instrument panel 16, such that when electromagnetic attraction is reduced during a vehicle impact event, the vehicle display unit 24 may yield when contacted by a force within the vehicle 10, but may remain coupled to the instrument panel 16 during the vehicle impact event.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle system, comprising:
   a vehicle structure;
   a vehicle component coupled to the vehicle structure via electromagnetic attraction;
   an attachment feature that additionally couples the vehicle structure to the vehicle component;
   a sensor configured to sense at least one of an expected vehicle impact event and a vehicle impact event; and
   a controller configured to generate a command to vary the amount of electromagnetic attraction between the vehicle structure and the vehicle component in response to a received vehicle threat signal from the sensor indicating at least one of a sensed expected vehicle impact event and a sensed vehicle impact event, wherein the attachment feature is configured to yieldingly maintain the vehicle component in a use position relative to the vehicle structure, irrespective of the amount of electromagnetic attraction between the vehicle component and the vehicle structure.

2. The vehicle system of claim 1, wherein the vehicle component comprises a vehicle display unit.

3. The vehicle system of claim 2, wherein the vehicle structure comprises a vehicle instrument panel.

4. The vehicle system of claim 1, wherein the controller is configured to generate a command to decrease the amount of electromagnetic attraction between the vehicle structure and the vehicle component in response to the received vehicle threat signal.

5. The vehicle system of claim 1, wherein the vehicle threat signal received by the controller is transmitted to the controller from the sensor based on a sensed vehicle impact event.

6. A method of operating a vehicle, comprising the steps of:
   sensing at least one of an expected vehicle impact event and a vehicle impact event;
   varying an amount of electromagnetic attraction coupling a vehicle component to a vehicle structure based on the sensed at least one of the expected vehicle impact event and the vehicle impact event; and
   yieldingly maintaining the vehicle component in a use position relative to the vehicle structure via an attachment feature, irrespective of the amount of electromagnetic attraction coupling the vehicle component to the vehicle structure.

7. The method of claim 6, wherein the amount of electromagnetic attraction coupling the vehicle component to the vehicle structure decreases based on the sensed at least one of the expected vehicle impact event and the vehicle impact event.

8. The method of claim 7, wherein the amount of electromagnetic attraction coupling the vehicle component to the vehicle structure decreases such that electromagnetic attraction between the vehicle component and the vehicle structure is substantially eliminated based on the sensed at least one of the expected vehicle impact event and the vehicle impact event.

9. The method of claim 6, wherein the vehicle component comprises a vehicle display unit.

10. The method of claim 9, wherein the vehicle structure comprises a vehicle instrument panel.

11. A vehicle system, comprising:
    a vehicle structure;
    a vehicle component coupled to the vehicle structure via electromagnetic attraction;
    a controller configured to vary an amount of electromagnetic attraction; and
    an attachment feature that additionally couples the vehicle structure and the vehicle component, wherein the attachment feature is configured to yieldingly maintain the vehicle component in a use position relative to the vehicle structure irrespective of the amount of the electromagnetic attraction coupling the vehicle component to the vehicle structure.

* * * * *